Oct. 30, 1945. A. B. MACHADO 2,388,211
CONSTANT MULTIPLIER CONTROL
Filed Sept. 8, 1941 14 Sheets-Sheet 4
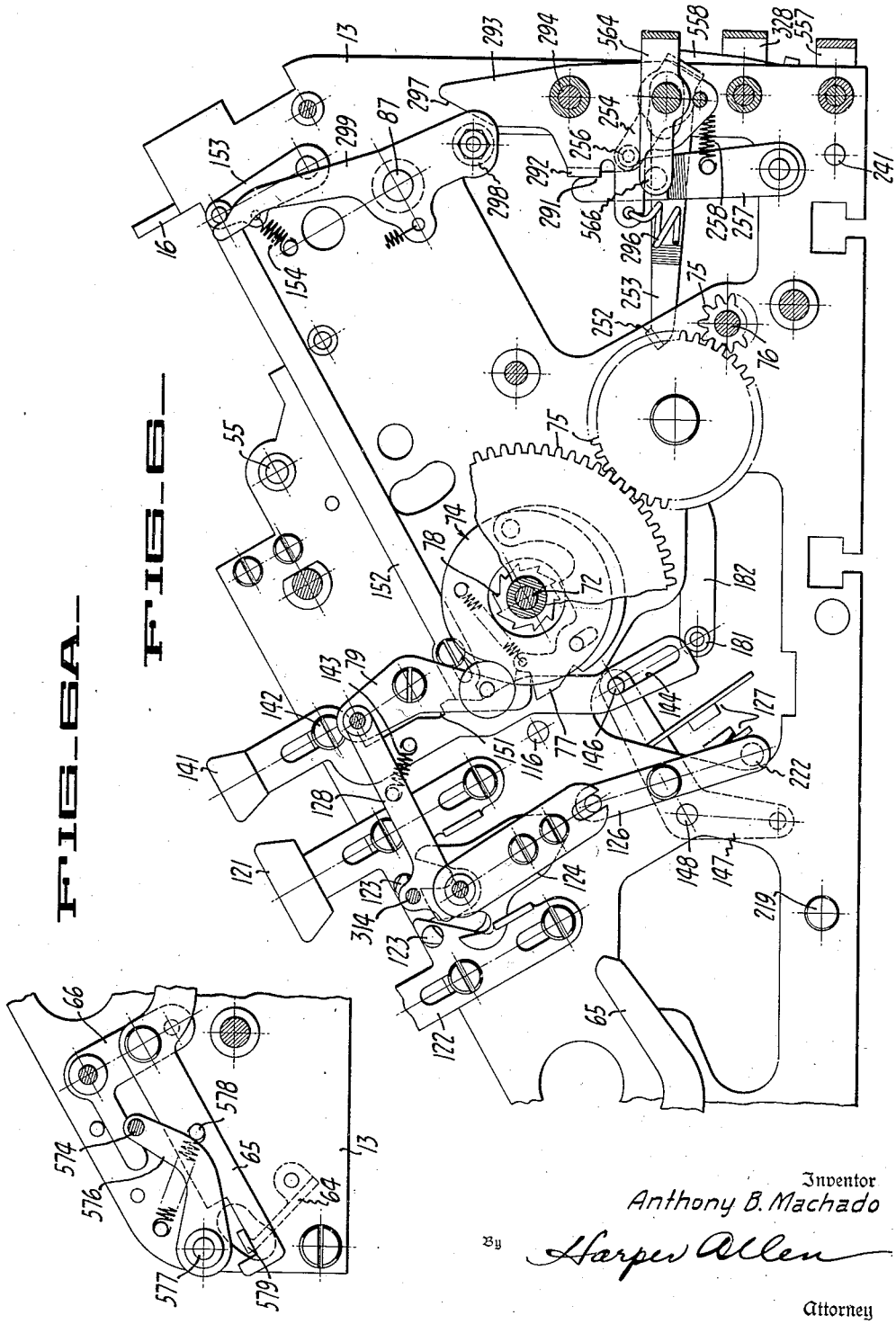
Inventor
Anthony B. Machado
By Harper Allen
Attorney

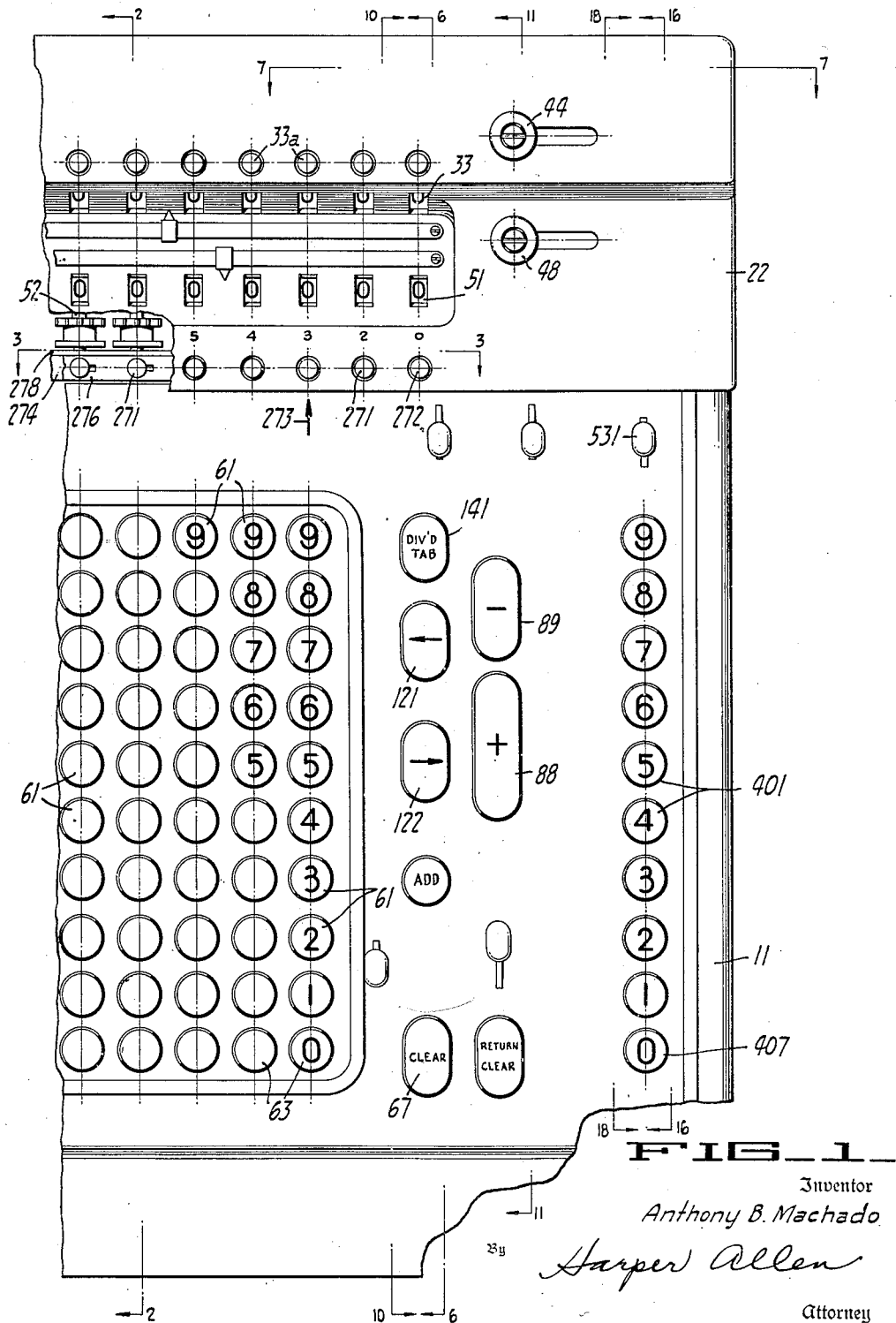
FIG_1

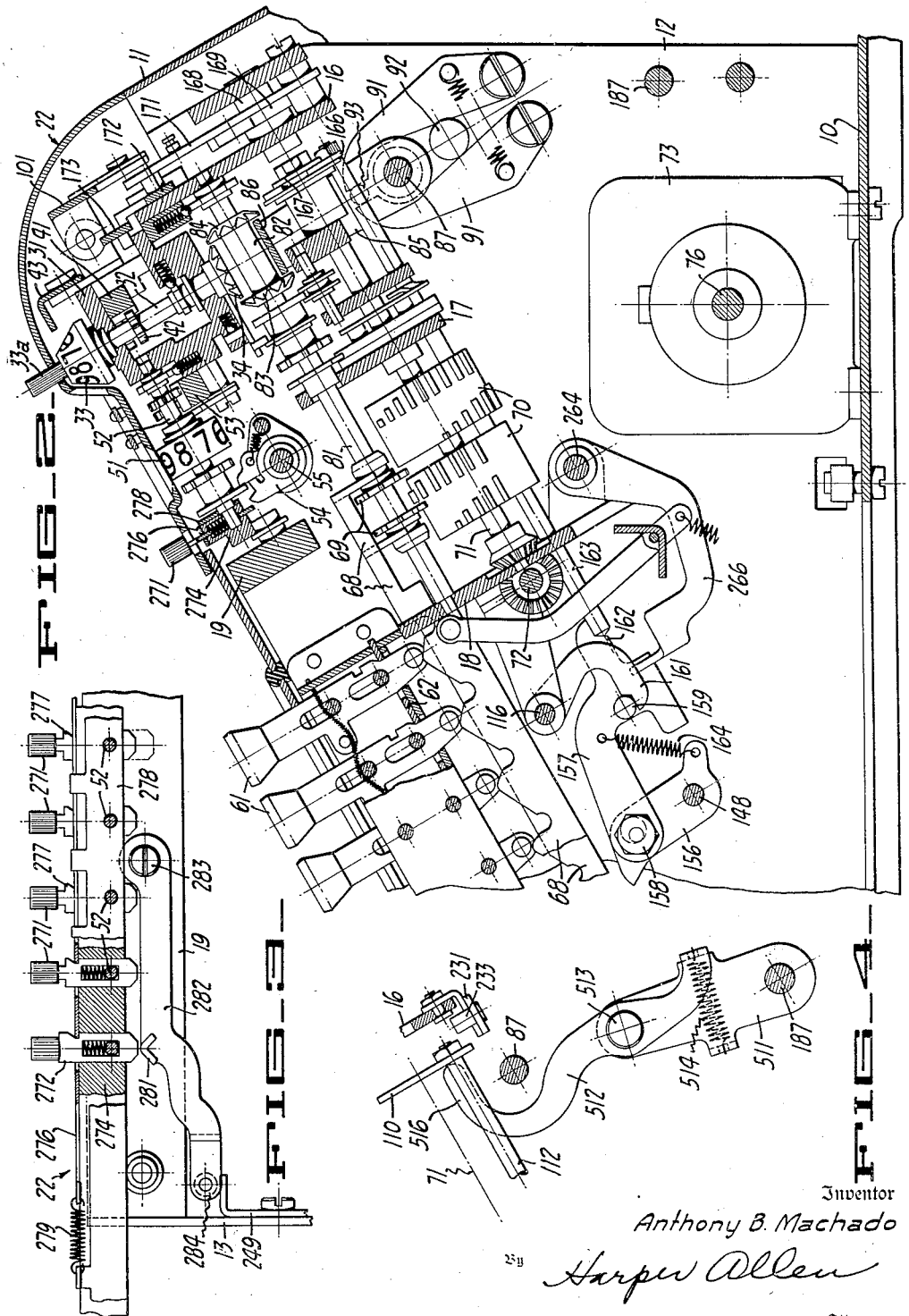

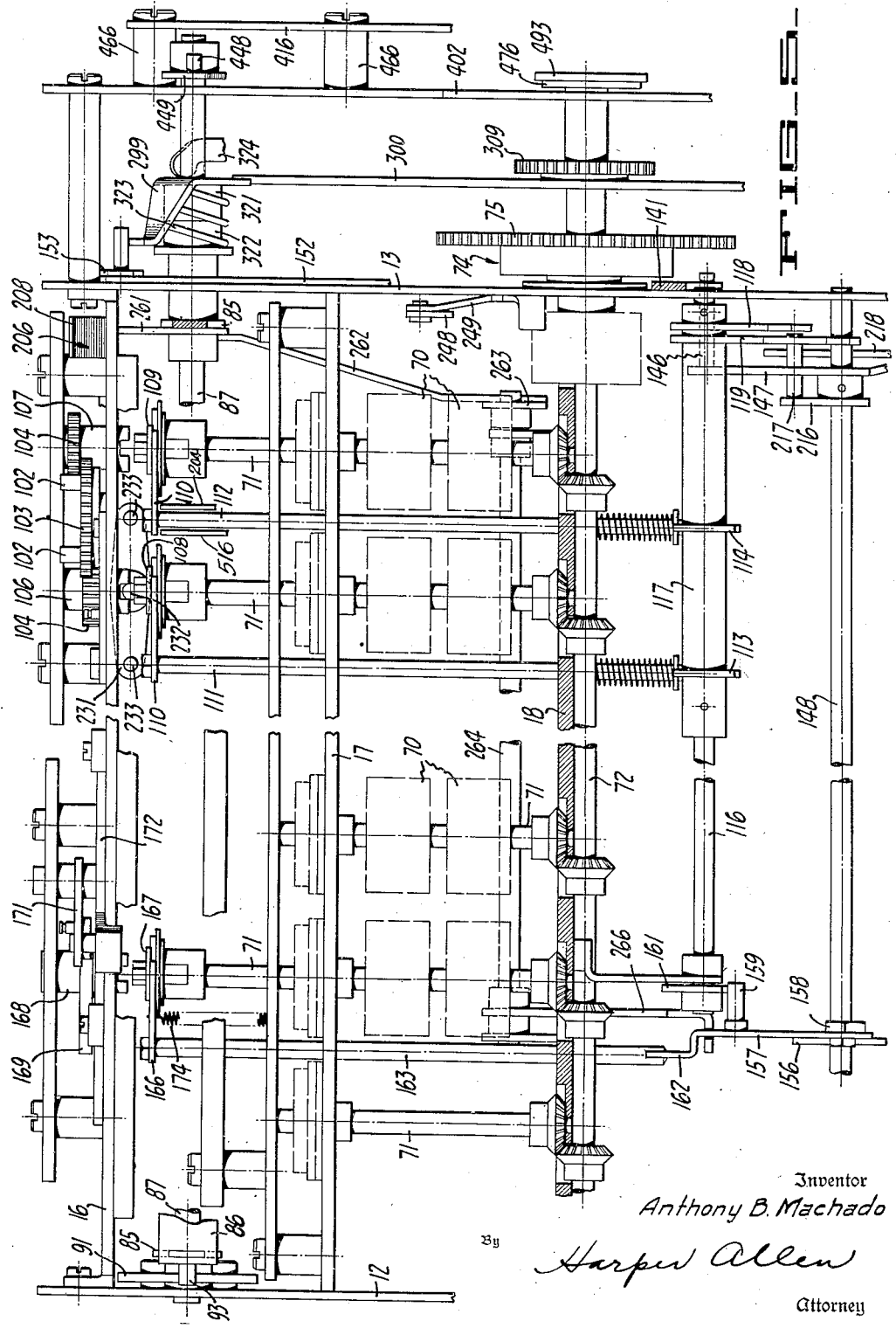

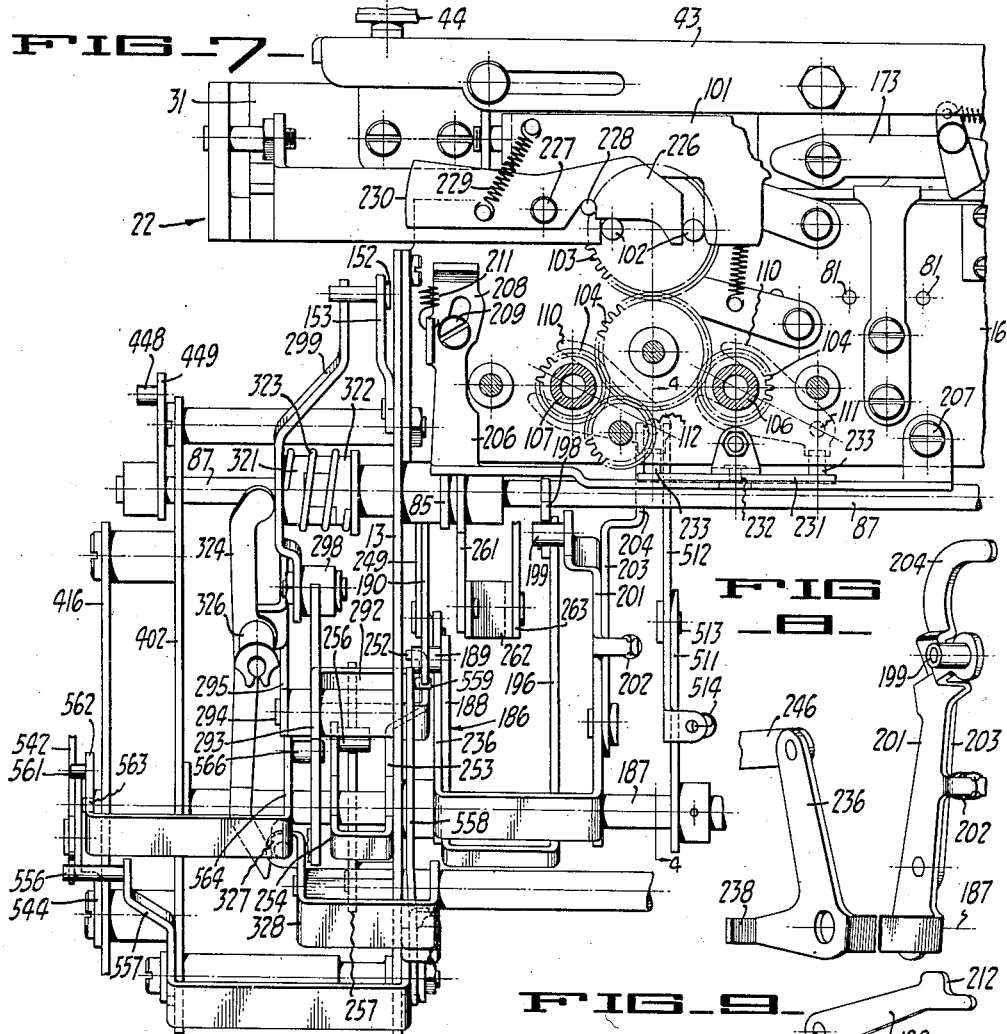
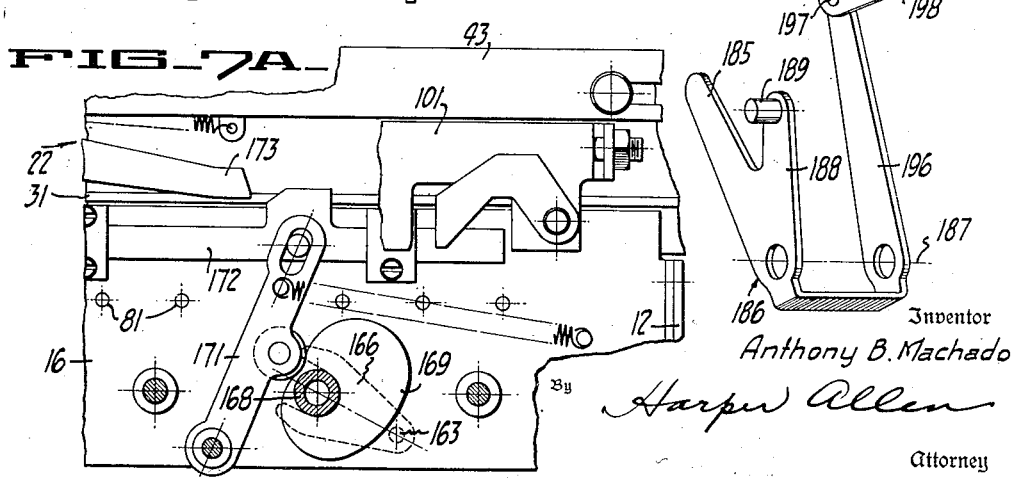

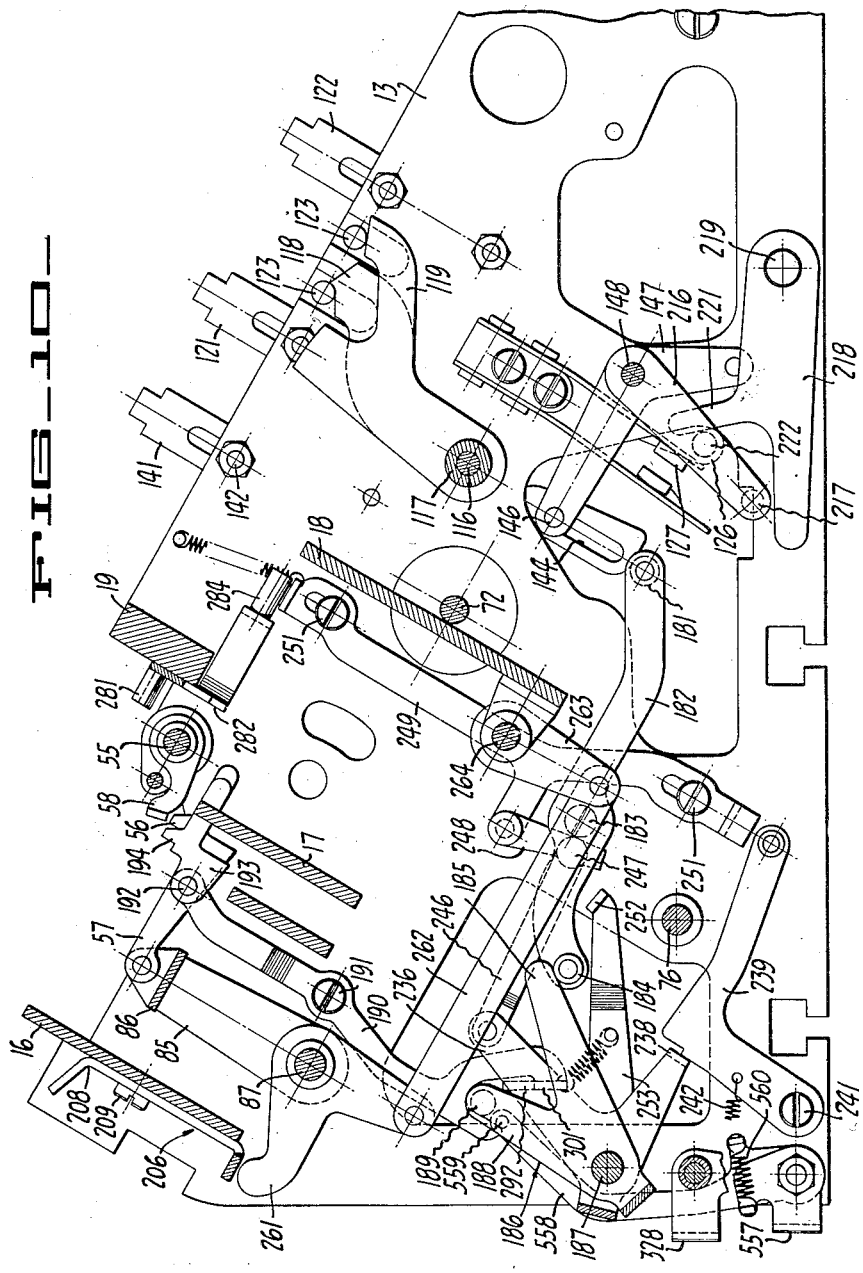

Oct. 30, 1945.    A. B. MACHADO    2,388,211
CONSTANT MULTIPLIER CONTROL
Filed Sept. 8, 1941    14 Sheets-Sheet 7
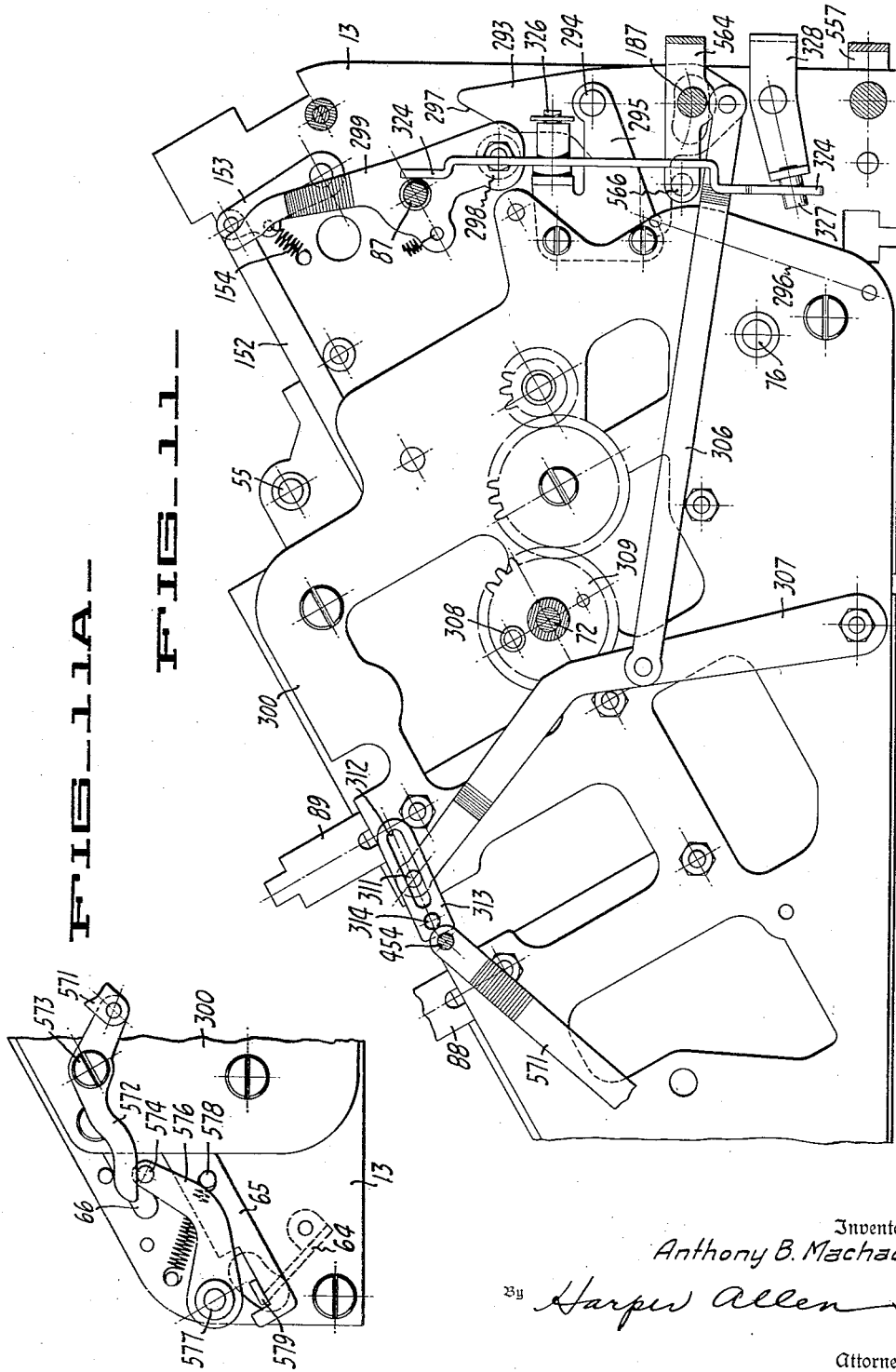
Inventor
Anthony B. Machado
By Harper Allen
Attorney

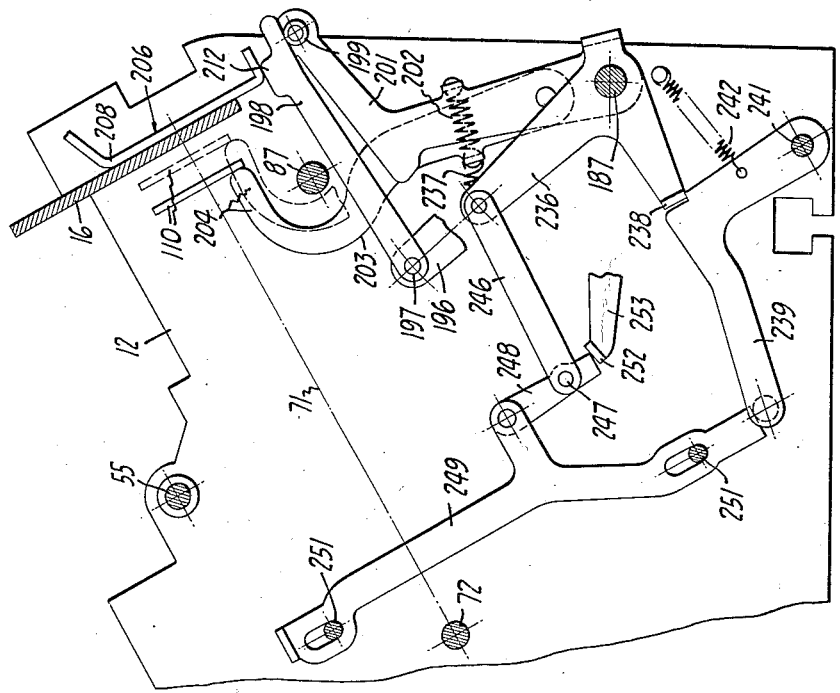
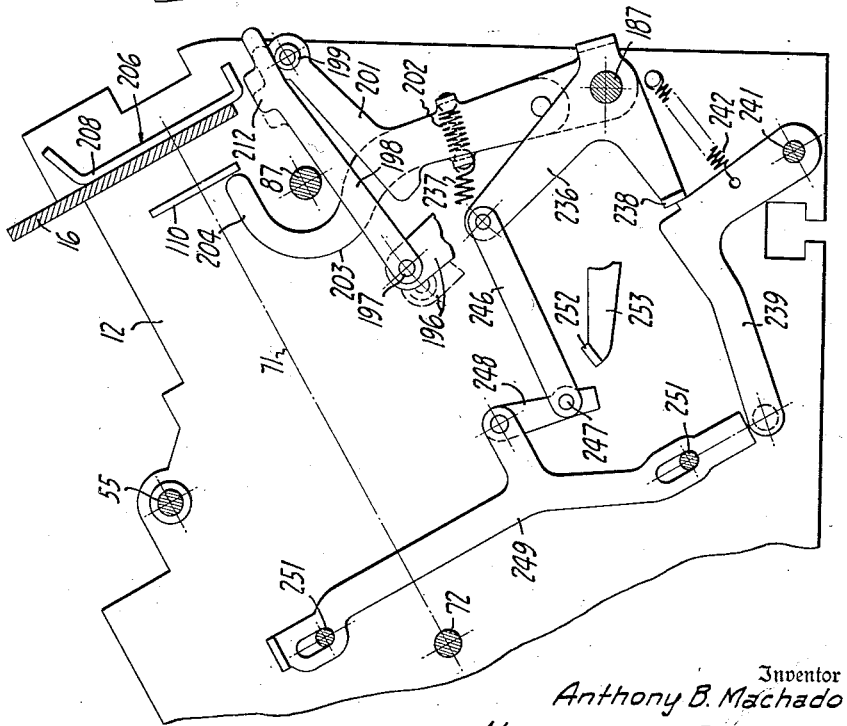

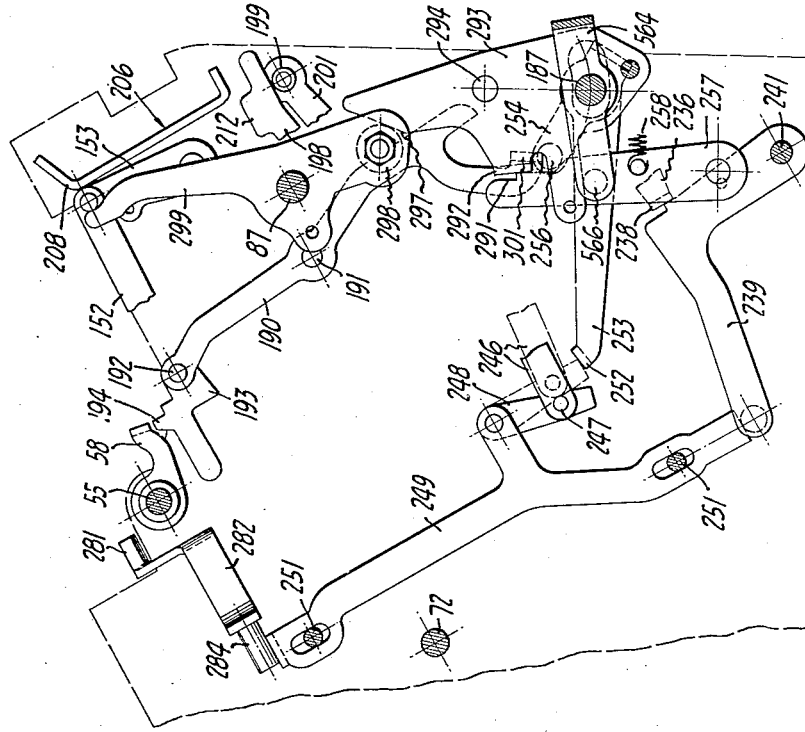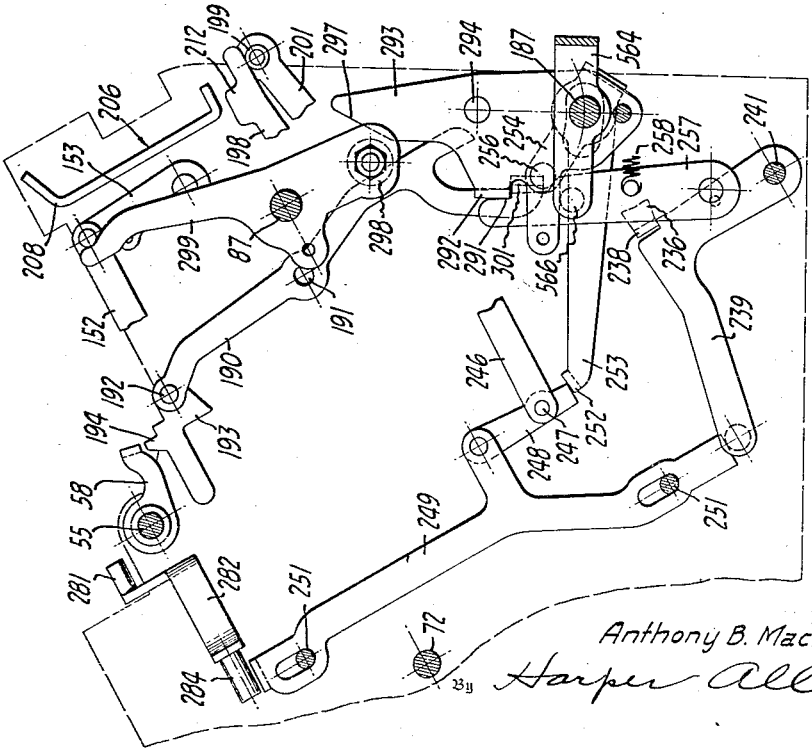

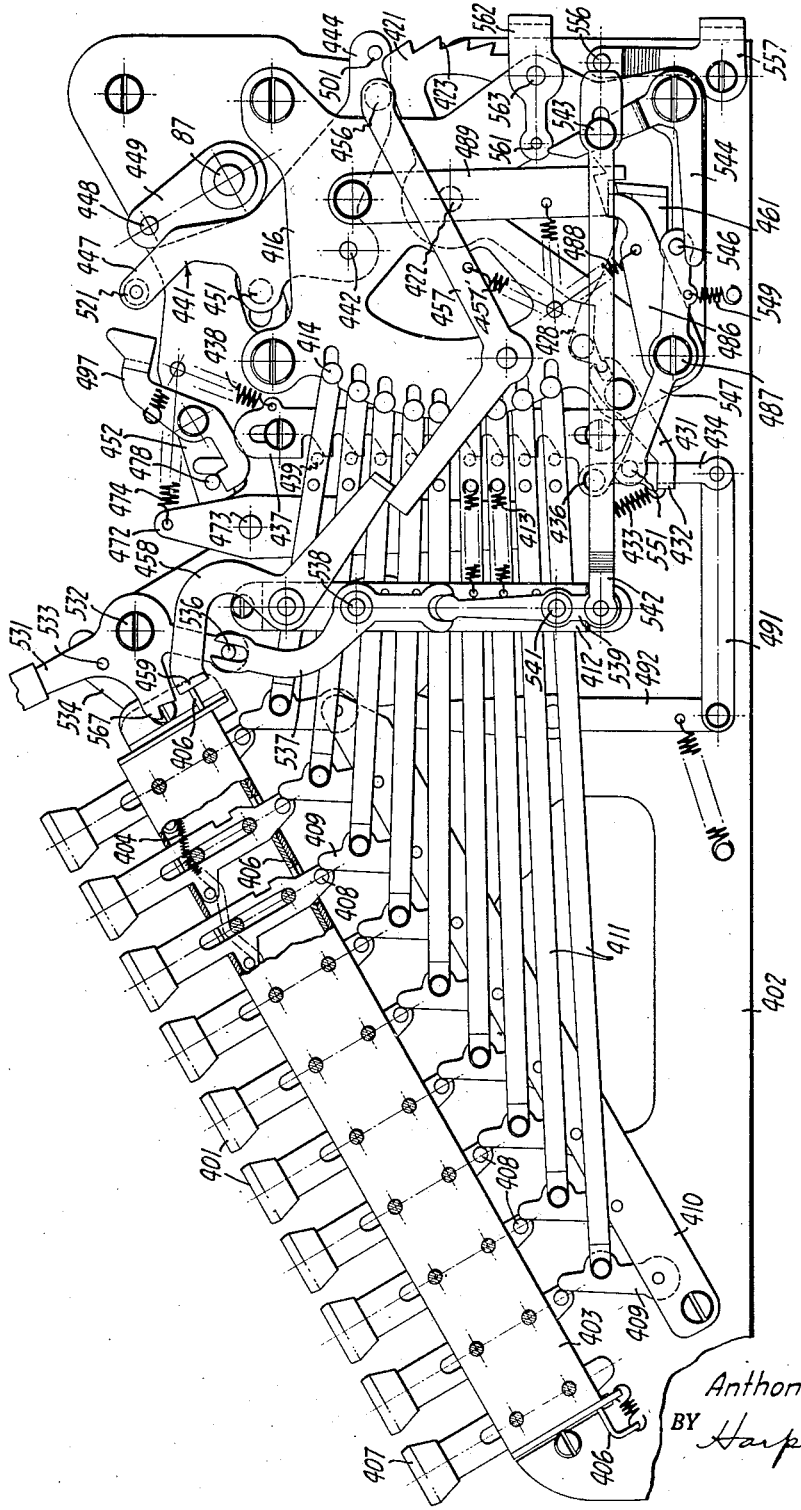

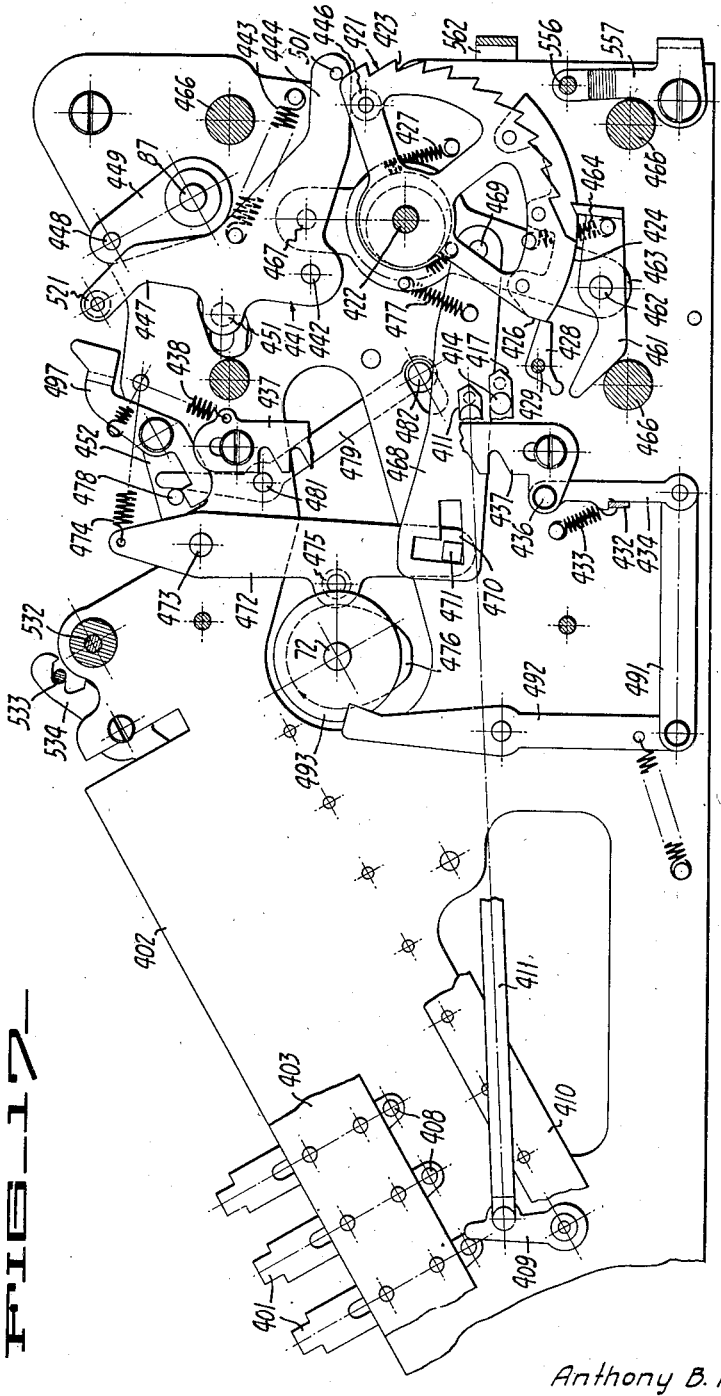
Oct. 30, 1945. A. B. MACHADO 2,388,211
CONSTANT MULTIPLIER CONTROL
Filed Sept. 8, 1941 14 Sheets-Sheet 11
FIG_17
Inventor
Anthony B. Machado
BY Harper Allen
Attorney Oct. 30, 1945. A. B. MACHADO 2,388,211
CONSTANT MULTIPLIER CONTROL
Filed Sept. 8, 1941    14 Sheets-Sheet 12
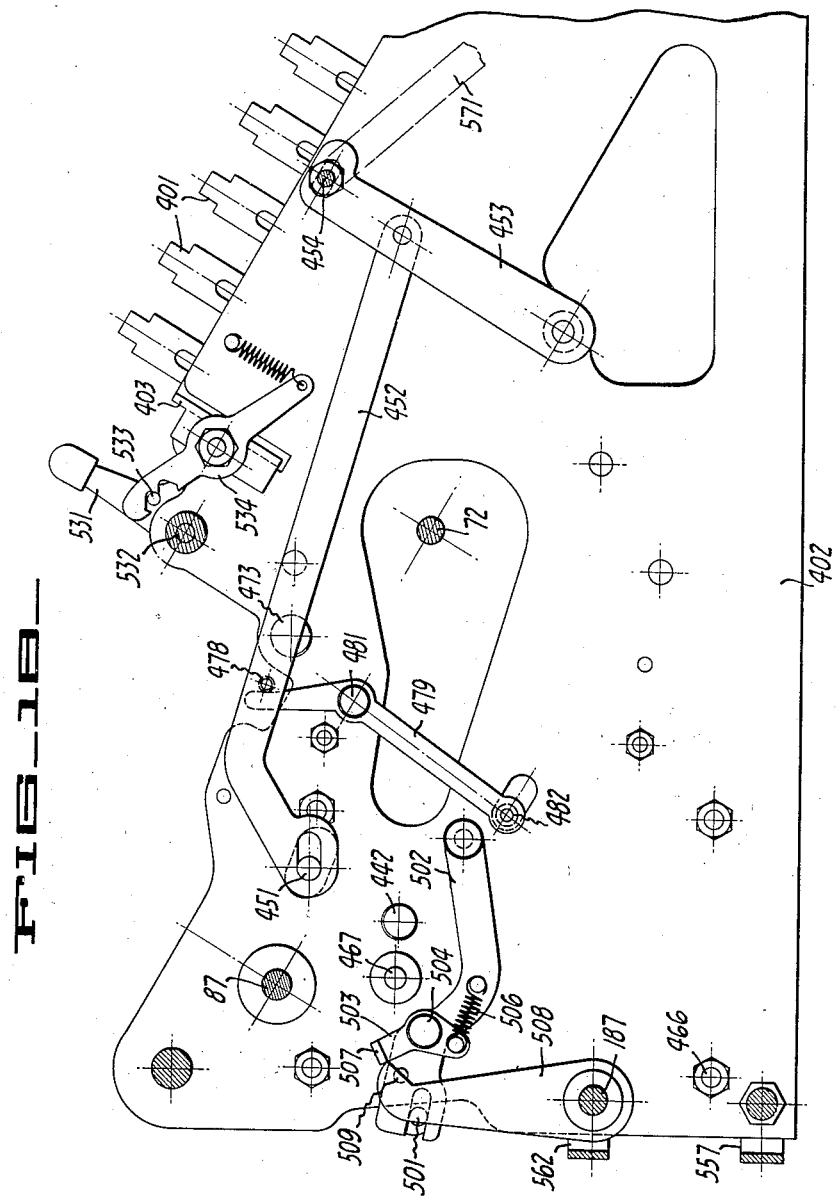
INVENTOR.
Anthony B. Machado
BY Harper Allen
ATTORNEY Oct. 30, 1945.  A. B. MACHADO  2,388,211
CONSTANT MULTIPLIER CONTROL
Filed Sept. 8, 1941  14 Sheets-Sheet 13

Inventor
*Anthony B. Machado*

Harper Allen

Attorney

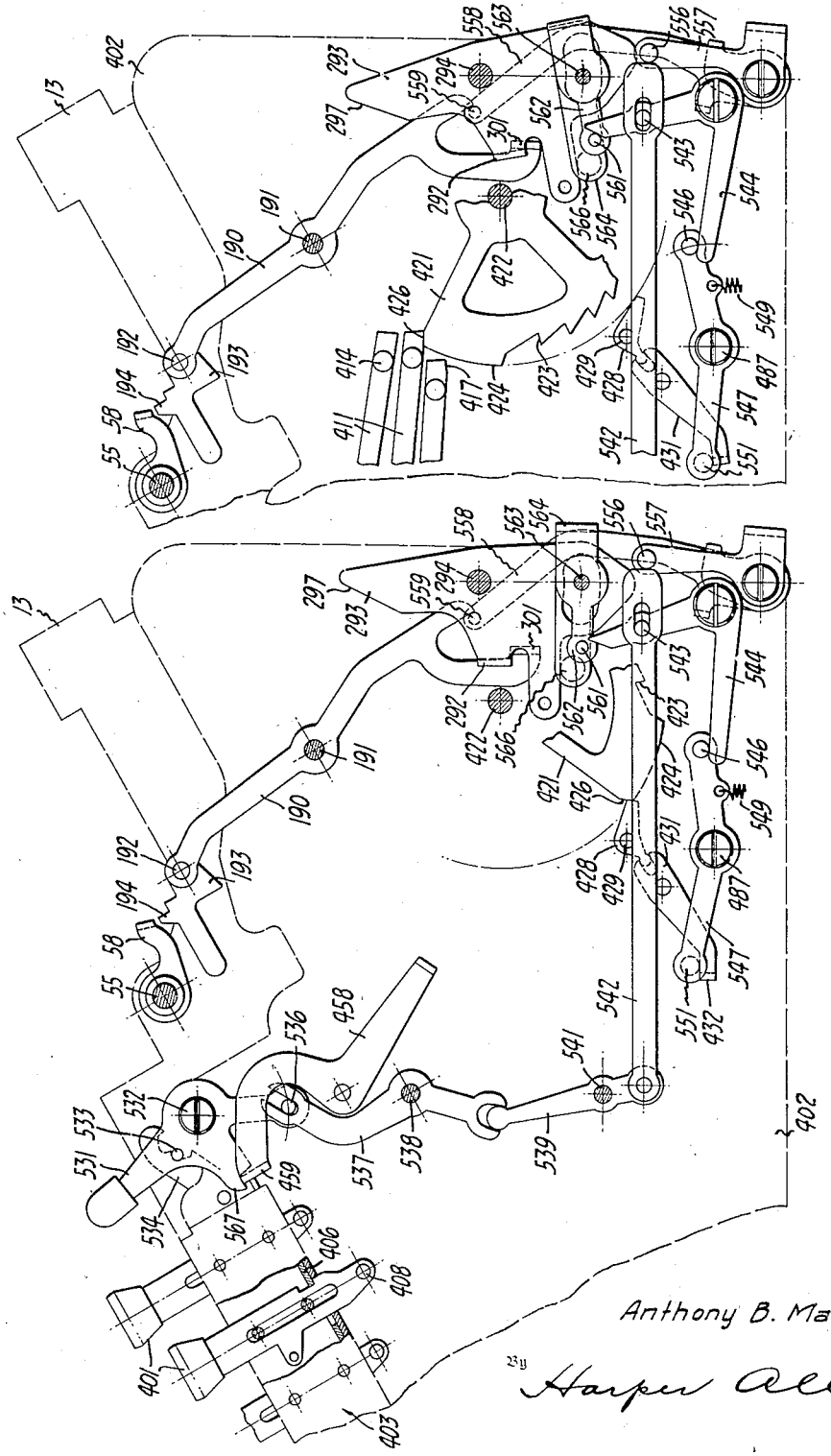

Patented Oct. 30, 1945

2,388,211

UNITED STATES PATENT OFFICE 2,388,211

CONSTANT MULTIPLIER CONTROL

Anthony B. Machado, Oakland, Calif., assignor to Friden Calculating Machine Co., Inc., a corporation of California Application September 8, 1941, Serial No. 409,955

3 Claims. (Cl. 235—63)

This invention relates to calculating machines and is concerned more particularly with the provision of improved automatic control means therefor in multiple item entering operations.

It is a general object of the invention to provide an improved calculating machine having automatic control means for effecting multiple entry of an item in a selected ordinal position.

Another object of the invention is to provide a calculating machine of the character referred to having tabulating mechanism and multiplier mechanism which can be coordinated by selective control to first effect tabulation of the accumulator to a selected ordinal position under control of the tabulating mechanism and then to effect entry of the item for the desired number of times under control of the multiplier mechanism, particularly where the same multiplier factor is used in a series of calculations.

Other objects and advantages of the invention will be apparent from the following description of a preferred embodiment as illustrated in the accompanying drawings, in which:

Figure 1 is a plan view of the right hand portion of a calculating machine embodying the invention;

Figure 2 is a longitudinal sectional elevation through the rear portion of the calculating machine taken in a plane indicated by the line 2—2 in Figure 1;

Figure 3 is a fragmentary sectional view of a part of the tabulator control mechanism taken as indicated by the line 3—3 in Figure 1;

Figure 4 is a fragmentary elevational view with certain parts in section, the view being taken as indicated by the line 4—4 in Figure 7;

Figure 5 is a schematic plan view of the rear portion of the calculating machine with the carriage and keyboard removed. Certain parts are shown in section and others are omitted to clarify the view;

Figure 20:
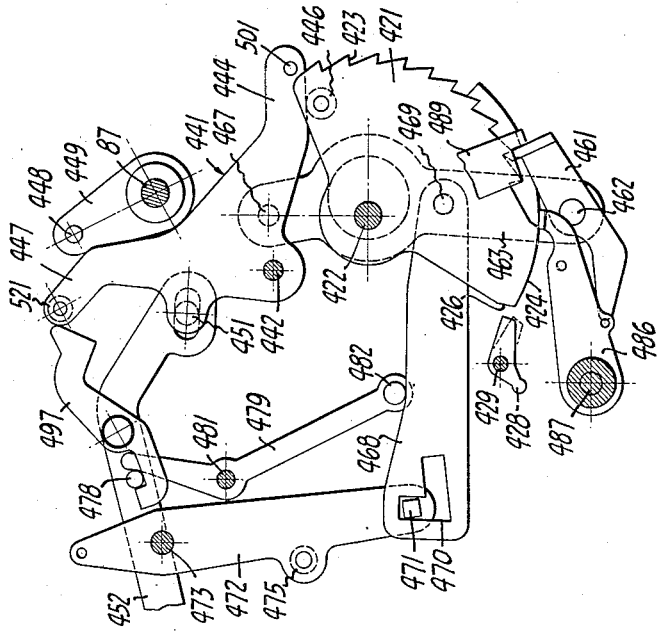

Figures 6 and 6A together present a side elevational view of the right side plate and the parts mounted thereon, as indicated by the line 6—6 in Figure 1;

Figure 7 is a fragmentary, rear elevational view of the right portion of the machine taken as indicated by the line 7—7 in Figure 1;

Figure 7A is a continuation of the upper portion of Figure 7;

Figure 8 is a perspective view of a part of the tabulator control mechanism;

Figure 9 is a perspective view of a part of the tabulator control mechanism;

Figure 10 is a sectional elevation looking toward the inside wall of the right side plate as indicated by the line 10—10 in Figure 1;

Figures 11 and 11A combined present an elevational view of a part of the control mechanism as indicated by the line 11—11 in Figure 1;

Figures 12, 13, 14 and 15 are operational views of various parts of the tabulator control mechanism as will appear more clearly in connection with the description of the operation of the machine;

Figure 16 is a right side elevational view of the multiplier mechanism with certain parts shown in section, the view being taken as indicated by the line 16—16 in Figure 1;

Figure 17 is a right side elevational view of the multiplier mechanism with certain parts omitted to clarify the view;

Figure 18 is a sectional elevational view taken as indicated by the line 18—18 in Figure 1;

Figures 19, 20, 21 and 22 are schematic operation views of the multiplier mechanism and its operative coordination with the tabulating mechanism.

The invention is disclosed as embodied in a calculating machine having actuating mechanism of the uni-directional, continuous drive cycle type wherein all power driven operations are effected by engagement and disengagement of a single clutch providing the only path of power flow from the motor of the machine to the motor-driven parts thereof. A calculating machine of this construction is disclosed in the copending application of Carl M. Friden, Serial No. 42,268, filed September 26, 1935, now Patent No. 2,310,281, which issued February 9, 1943.

The frame of the machine includes a base 10 (Figures 1, 2 and 5) on which left and right side frame plates 12 and 13 are mounted within casing 11. Side plates 12 and 13 may be connected by cross brackets 16, 17, 18 and 19 (Figures 2 and 5) which serve to support various mechanisms of the machine. The register carriage 22 (Figures 1 and 2) which supports the accumulator and the revolutions counter is suitably mounted on the frame brackets 16 and 19 for endwise shifting movement laterally of the machine in either direction to various ordinal positions as controlled by means described hereinafter.

Carriage 22 (Figure 2) includes a frame 31 in which numeral wheel shafts 32 are journaled to carry numeral wheels 33 of conventional construction. Numeral wheels 33 have projecting twirler knobs 33a for manual setting thereof. To transmit increments of value to numeral wheels 33, each shaft 32 extends below the frame 31 and has a ten-tooth gear 34 which is actuated by means later described.

Accumulator resetting means

Means are provided on the carriage for resetting the numeral wheels 33 (Figure 2) to zero registration including means such as a rack bar 41 mounted for endwise sliding movement in the carriage frame adjacent the upper end of the numeral wheel shafts 32 for cooperation with mutilated gears 42 carried by numeral wheel shafts 32. Adjacent gears 42 are axially offset to cooperate with the adjacent vertically offset racks formed on rack bar 41 in the usual manner. When rack bar 41 is moved from its normal position to which it is spring urged in the usual manner, it will engage the gear 42 of a numeral wheel 33 displaced from the zero position and reset the numeral wheel to such position. Rack 41 carries a handle 44 (Figure 1) for manual operation and may be connected to an actuating bar 43 for power operation. Bar 43 is suitably mounted for sliding movement on the frame 31 and may be selectively coupled with rack bar 41. This mechanism is disclosed and claimed in the copending application of Carl M. Friden, Serial Number 240,269, filed November 14, 1938, now Patent No. 2,294,083, which issued August 25, 1943.

Drive, selecting and actuating mechanisms

The values to be introduced into numeral wheels 33 are selected by means of a plurality of banks or orders of settable value keys 61 (Figures 1 and 2) of conventional construction. Keys 61 are mounted for endwise sliding movement and are adapted to be latched in depressed position by a latching bar 62 associated with each bank of keys 61 and adapted to be operated to release a depressed key by zero key 63 in each order. All of the orders of keys can be released simultaneously by the operation of a key releasing gate 64 extending along the front edge thereof in the usual manner. Gate 64 is operable through link 65 (Figure 6A) and bellcrank 66 by means of keyboard release key 67 (Figure 1) in the usual manner.

The keys 61 (Figure 2) cooperate with selecting mechanism including spring urged selecting slides 68 mounted for endwise movement to position gears 69 selectively with respect to the stepped teeth of the associated actuating cylinders 70. Cylinders 70 for adjacent orders are mounted on actuating shafts 71 (Figures 2 and 5) having suitable bevel gear connections with a transverse drive shaft 72 which is suitably journaled in side plates 12 and 13.

Shaft 72 and shafts 71 are driven cyclically from motor 73 (Fig. 2) through clutch 74 (Figures 5 and 6) which may be driven by suitable gearing 75 from the motor shaft 76. Clutch 74 may be engaged or disengaged by oscillation of spring urged clutch pawl or dog 77 mounted for rotation with shaft 72 and with respect to ratchet 78 journaled on shaft 72 and driven by gearing 75. Clutch control lever 79 is pivoted on side plate 13 to determine engagement or disengagement of the clutch by releasing or engaging the nose of dog 77 in the full cycle position thereof.

The number of increments transmitted to a gear 69 (Figure 2) by a cylinder 70 during cyclic operation of the clutch is transmitted to a square shaft 81 which carries each ordinal pair of gears 69 and extends rearwardly of the machine in the usual manner. Each shaft 81 carries a spool 82 having bevel gears 83 and 84 for cooperation with the aligned numeral wheel gear 34.

The engagement of gears 83 and 84 with gears 34 is controlled by strap 86 positioned between the gears and mounted by suitable arms 85 for rocking movement with shaft 87. Thus, rocking of shaft 87 determines transmission of said increments to the numeral wheels and also the direction of entering thereon. Any suitable control means such as plus key 88 (Figure 1) and minus key 89 may be provided for rocking the shaft 87 to cause positive and negative registration as shown in Patent No. 2,229,889, dated January 28, 1941. Shaft 87 may be centralized by a pair of spring urged centralizing arms 91 (Figure 2) cooperating with a central stop 92 and engaging a pin 93 carried by one of arms 85.

Revolutions counter mechanism

The revolutions counter may comprise numeral wheels 51 (Figure 2) on shafts 52 which may be reset to zero by rack bar 53 similar to the rack bar 41 described above. Rack bar 53 carries handle 48 (Figure 1) for manual operation and may be selectively connected to actuating bar 43 as described in said Patent No. 2,294,083.

The numeral wheels 51 (Figure 2) are actuated by means of a conventional actuator 54 mounted on a shaft 55 which is rocked from drive shaft 72 through a spring connection in a clockwise direction from the position shown in Figure 2 into operative engagement with the aligned numeral wheel 51, and then is translated axially to effect entry of the digit. When no count is to be made, the clockwise rocking movement may be restrained by means of a neutralizing finger 56 (Figure 10) carried by a slide 57 guided on cross bracket 17 and pivotally connected to plus-minus gate or strap 86 to be controlled thereby. In the central neutral position of strap 86, finger 56 underlies arm 58 of the counter actuator and thereby blocks rocking movement thereof.

Carriage shift mechanism

The carriage can be shifted selectively in either direction by power driven means controlled by manually operable keys, and this mechanism is of conventional construction. Carriage 22 is provided with toothed shift rack 101 (Figures 2 and 7) along the rear side thereof for cooperation with shift pins 102 on shift gear 103. Shift gear 103 (Figures 5 and 7) can be rotated in either direction and receives one-half rotation for each rotation of the clutch referred to above. For this purpose the shift gear 103 is connected by suitable gearing 104 to respective gear sleeves 106, 107, the gearing being arranged so that the drive from gear sleeve 106 rotates gear 103 in one direction, and the drive from gear sleeve 107 rotates gear 103 in the other direction. The respective gear sleeves 106, 107 (Figure 5) are slotted for engagement by toothed collars 108, 109 mounted slidably but non-rotatably on the rearward ends of a pair of adjacent actuating shafts 71.

The sliding movement of collars 108, 109 (Figure 5) is controlled through forks 110 by means of spring-urged rods 111, 112 which extend forwardly of the machine and abut similar depending arms 113, 114 carried by shaft 116 and sleeve 117 mounted thereon. Adjacent side plate 13 (Figures 5 and 10) shaft 116 and sleeve 117 have upstanding arms 118 and 119 operated by suitable rollers on shift keys 121 and 122 so that selective depression of the keys controls the direction of carriage shifting.

To enable the power drive, shift keys 121 and 122 (Figure 6) have respective pins 123 cooperating with lever 124 operatively connected by lever 126 to control contacts 127 of the motor drive, and connected by link 128 with clutch control lever 79. Thus, on depression of either of keys 121 or 122, the clutch is engaged and the motor circuit enabled.

From the foregoing, it is seen that the carriage can be shifted selectively in either direction.

Tabulation and dividend entry

The tabulating and dividend entering mechanism is of the type disclosed and claimed in the copending application of Carl M. Friden and Anthony B. Machado, Serial No. 315,986, filed January 27, 1940, for "Calculating machine," and operates to zeroize the registers as a preliminary to a division operation, and to effect entry of the dividend into the accumulator in any selected ordinal position which may be pre-set in accordance with the problem being solved, while suppressing the usual count made in the revolutions counter during entry of a number in the accumulator. After setting of the dividend into the keyboard, the only other operation necessary is the depression of the dividend control means or key, after which the machine automatically operates to perform the above described functions, the desired ordinal position of the carriage upon entry of the dividend having been preset in accordance with the number of quotient figures desired, or the desired position of the decimal point in the quotient.

The first operation which occurs upon depression of the dividend key is a shifting of the carriage to its leftmost position if displaced therefrom for a power clearance operation.

*Dividend or tabulating key.*—Referring to Figures 1 and 6, dividend key 141 is mounted for endwise sliding movement in side plate 13 by means of pin 142 engaging a slot therein. Spring 143 urges key 141 to the raised position shown in Figure 6. The lower end of key 141 is provided with elongated slot 144 which is engaged by pin 146 carried at the end of lever 147 mounted on transverse shaft 148 (Figures 5 and 6).

Intermediate its ends, key 141 (Figure 6) is provided with latching face 151 for engagement by the latching end of a latch slide 152 mounted for endwise sliding movement on side plate 13 with its rear end pivotally supported on upstanding pivotally mounted arm 153. Spring 154 is associated with arm 153 to urge slide 152 to latching position. Thus, upon depression of key 141 it is latched in depressed position, and it remains there until the end of the operation when delatching occurs by means described later.

Depression of key 141 serves to enable a shift of the carriage to the left, to enable a power clearance mechanism, to condition the shift to the right, to block out the counter actuator and to enable the drive.

The shift of the carriage to the left and the power clearance mechanism for the registers is enabled upon depression of key 141 (Figures 5 and 6) when the key operates through arm 147 to rock the shaft 148 in a clockwise direction as viewed in Figures 2 and 6. Referring to Figure 2, shaft 148 carries an upstanding arm 156 which is connected to a forwardly extending pusher link 157 by an eccentric pivot 158. Pusher link 157 carries a pin 159 cooperatively related with depending arm 161 secured on transverse shaft 116. Shaft 116, as previously described, carries a depending arm 113 (Figure 5) which abuts the end of shift control rod 111 for the shift drive connection to the left. Thus, upon depression of the dividend key the shift drive connection determining shifting to the left will be engaged by the above described linkage.

To enable the power driven resetting mechanism, pusher link 157 (Figures 2 and 5) is provided with offset notched end 162 in operative pushing engagement with the end of control rod 163 for the power clearance drive. This engagement is maintained by the tension of spring 164 connected between pusher link 157 and arm 156. As seen in Figure 5, rod 163 extends rearwardly and carries control fork 166 for shiftable drive establishing collar 167 having a slidable but non-rotatable driving engagement with one of the actuating shafts 71, and being toothed for engagement with the slotted hub 168 of cam 169. As seen in Figure 7A, cam 169 is operatively related with arm 171 to drive actuating slide 172 for power resetting, which in the leftmost position of the carriage is operatively related to arm 173 (Figures 7 and 7A) carried by actuating bar 43. The above described mechanism forms part of a conventional power return clearance mechanism as described in said patent to Carl M. Friden, No. 2,294,083.

From the foregoing it will be seen that upon clockwise oscillation of shaft 148, as viewed in Figure 2, caused by depression of the dividend key, pusher link 157 operates to push rod 163 rearwardly against the tension of spring 174, and to thereby engage the drive connection between collar 167 and hub 168, so that power resetting will occur when the carriage is in its leftmost position. As described later, this control is disabled at the end of the resetting operation.

As previously stated, depression of the dividend key 141 also serves to block out the counter actuator and prevent operation thereof, and to condition the shift mechanism for shifting to the right at the end of the return-clear operation.

As seen in Figures 6 and 10, the lower end of dividend key 141 is engaged in its uppermost position with a roller 181 carried by lever 182, pivoted at 183 on side plate 13. Lever 182 carries a roller 184 (Figure 10) operatively disposed beneath the forwardly extending arm 185 of a bellcrank 186 pivoted on shaft 187, which is suitably mounted on side plate 13. The movement of bellcrank 186 is utilized to block the counter actuator from operation and also to condition the shift mechanism for shifting the carriage to the right at the end of the return-clear operation.

In order to block out the operation of the counter actuator by movement of the bellcrank 186 (Figure 10), the upright arm 188 of the bellcrank 186 carries a pin 189 operatively engaged with lever 190, pivoted at 191 on side plate 13. The upper end of lever 190 is pivotally connected at 192 with blocking slide 193 having projection 194 lying normally out of the path of oscillation of arm 58 of the counter actuator assembly. Counterclockwise rocking movement of bellcrank 186 operates through lever 190 to move the slide 193 and projection 194 thereof from the position shown in Figure 10 to that shown in Figure 14, where movement of the counter actuator to active position is prevented as previously explained in connection with the neutralizer slide 57.

In order to condition the shifting mechanism for tabulation to the right, arm 196 (Figures 7, 9 and 12) is formed integrally with bellcrank 186 and is pivotally connected at 197 to a link 198 extending rearwardly and riding on roller 199 on an arm 201 (Figures 7, 8 and 12) also pivoted on shaft 187. Arm 201 has an arm 203 connected thereto by spring 202 and is connected thereto by spring 202 so that arm 203 is biased to move with arm 201. Shift engaging arm 203 has a curved upper end 204 operatively engaged with shift controlling fork 110 (Figs. 7 and 12) of the right hand shifting mechanism. Link 198 is adapted to be disposed between the roller 199 and a lever 206 (Figures 7 and 12) pivoted at 207 on bracket 16. Upright end 208 of lever 206 has slotted engagement with a stud 209 on bracket 16 and is spring-urged upwardly by spring 211.

In order to establish a driving relation between the lever 206 and arm 201, link 198 is provided with a raised portion 212 which normally is disposed out of the path of the lever 206, as shown in dotted lines in Figure 12, but is moved into the full-line position upon depression of the dividend key, so that when the lever 206 is subsequently depressed (Fig. 13), as later described, arm 201 is rocked to operate through spring 202 to place a bias on arm 203 to engage the shift clutch for determining shifting or tabulation to the right as later described.

The dividend key 141 also engages the clutch and enables the motor circuit. It will be recalled that shaft 148 (Figure 10) is rocked in a counterclockwise direction upon depression of the dividend key, and during such movement a depending arm 216 serves through its pin 217 to rock an arm 218 pivoted at 219 on side plate 13, and having an upstanding finger 221 operatively related with roller 222, carried at the lower end of lever 126 (Figures 6 and 10). Upon counterclockwise movement of arm 218 (as viewed in Figure 10) lever 126 (Figure 6) will be rocked in a counterclockwise direction to close contacts 127, and to operate through lever 124 and link 128 (Figure 6) to move clutch control lever 79 from the position shown in Figure 6 to its clutch engaging position out of engagement with the clutch dog 77.

Thus upon depression of the dividend key 141, the first operation which ensues is a shifting of the carriage to its leftmost position if displaced therefrom, where a clearing or resetting operation is performed on either or both of the accumulator and counter. The clearing of the registers occurs during a cycle of operation with the carriage in its leftmost position, as shown in Figure 7, where one of shift pins 102 is engaged in the endmost tooth space of shift rack 101, which is formed in part by pawl 226, pivoted at 227 on the rack and urged against pin 228 by spring 229. With the carriage in the position shown, shift pin 102 during the clearing cycle, rotating in a clockwise direction serves to oscillate pawl 226 so that its extension 230 strikes end 208 of lever 206, and moves it downwardly, and this movement is utilized to initiate shifting of the carriage to the right to the selected position for entering the dividend.

At the beginning of the clear cycle, the parts are positioned as shown in Figure 12, where interponent arm 198 has its projection 212 disposed between the end 208 of lever 206 and roller 199 on shift conditioning arm 201. Thus, when pawl 226 moves downwardly, lever end 208 is depressed from the position shown in Figure 12 to that shown in Figure 13, when lever 201 operates through spring 202 to place tension on shift engaging arm 203. The movement of shift engaging arm 203 from the position shown in full lines in Figure 13 to that shown in dotted lines is delayed until the end of the cycle by interlock means associated with the shift engaging mechanism.

Referring to Figures 5 and 7, the interlock means comprises lever 231, pivoted at 232 on rear frame bracket 16, and having a pair of upstanding pins 233 spaced from and disposed in the path of respective shift forks 110 carried by rods 111 and 112. As seen in Figure 5, when one shift fork is moved rearwardly to engage the corresponding shift drive connection, the opposite pin 233 moves into blocking engagement with the other shift fork 110 to prevent operative movement thereof until the other shift drive is disengaged. Inasmuch as the shift drive for determining shifting to the left remains engaged until rocking of pawl 226 during the clear cycle, initiation of the shift to the right by movement of shift rod 112 by the hooked end 204 of arm 203 cannot occur until the end of the resetting cycle.

During the resetting cycle, certain other conditionings are affected in the machine. As seen in Figures 7, 8 and 10, arm 201 has integrally formed therewith a bellcrank 236 and both arm 201 and bellcrank 236 are urged to the position shown in Figure 12 by spring 237 attached to arm 201 and to the frame. The movement of the bellcrank 236 with arm 201 from the position shown in Figure 12 to that shown in Figure 13 is utilized to condition the control for entering the dividend at the end of the shifting operation to the right, and for maintaining the shift engaged until the selected tabulated position is reached.

To latch the bellcrank 236 and arm 201 in the position shown in Figure 13, the lower horizontal arm of bellcrank 236 is provided with laterally extending ear 238 adapted for engagement with a seat in a latch lever 239, pivoted at 241 on side plate 13, and urged in a clockwise direction by spring 242. As shown in Figure 13, upon clockwise movement of arm 201 and bellcrank 236, they are latched in position by latch lever 239.

The movement of bellcrank 236 also serves to condition means for engaging the plus-minus gears to enter the dividend at the end of the shift operation. For this purpose the upper arm of bellcrank 236 (Figure 12) is pivotally connected to a link 246, which is pivotally connected at 247 with a depending arm 248 pivoted to an actuating slide 249 mounted for vertical sliding movement on side plate 13, by slotted engagement with respective pins 251. As shown in Figure 12, depending arm 248 is normally to one side of an ear 252 of an arm 253 which forms part of a control to determine engagement of the plus-minus gears for entry of the dividend. Arm 253 (Figures 6, 7 and 14) is pivoted on shaft 187 and has integrally formed therewith an arm 254 carrying a roller 256 abutting a latch lever 257 pivoted on side plate 13 and urged in a clockwise direction by spring 258. As shown in Figures 13 and 14, arm 248 is operatively related to ear 252 so that downward movement of slide 249 will operate arms 253 and 254 to release latch lever 257 as later described.

The movement of lever 206 and end 208 thereof during the resetting operation also determines release of the shift connection determining shifting to the left. For this purpose bellcrank 261 (Figures 7 and 10) is pivoted on shaft 87 and has one arm disposed beneath end 208 of lever 206. The depending arm of bellcrank 261 is pivotally connected to link 262, having its forward end pivotally connected to depending arm 263 secured on transverse shaft 264 (Figures 5 and 10). Shaft 264 (Figures 2 and 5) carries an arm 266 which is slotted at its offset end to receive pusher link 157. Thus, counter-clockwise movement of the bellcrank 261, as viewed in Figure 10, moves link 262 forwardly to rock shaft 264 in a counterclockwise direction (in a clockwise direction as viewed in Figure 2) so that arm 266 lifts pusher link 157 against the urgency of spring 164 to move end 162 thereof out of engagement with push rod 163 for the clear mechanism, and to disengage pin 159 from arm 161 of the control means for determining shifting to the left. In this manner, both the shift connection for left hand shifting and the drive connection or resetting are disabled during the cycle performing the resetting operation so that they can be disengaged near the end of such cycle.

Tabulation control

As seen in Figures 1, 2 and 3, the carriage 22 is provided with a series of tabulator keys 271, numbered 0 and 2 to 9 in accordance with the position of the carriage. In the first or leftmost position of the carriage zero tabulator key 272 is aligned with arrow 273 on the casing of the machine. Tabulator keys 271, 272 are mounted for vertical endwise movement in broached slots in carriage frame bar 274, and keys 271 can be latched in depressed position by latching slide 276 (Figures 2 and 3), urged by spring 279. Slide 276 is adapted to engage over the tooth 277 of a depressed key. Zero key 272 provides a release key for any depressed key 271 which it may be desired to release in changing the setting of the machine to cause positioning of the carriage in its rightmost position. In alignment with the "10" key 271, a suitable fixed cam (not shown) is provided on the carriage which operates arm 282 (referred to hereinafter) irrespective of the depression of "10" key 271. Thus, "10" key 271 is a dummy key provided merely for the operator's convenience. Latching slide 276 is maintained in position in the frame bar 274 by retaining bracket 278. Keys 271 and 272 are urged to their raised positions by suitable springs.

A depressed key 271, as indicated in dotted lines in Figure 3, is adapted to engage a V-shaped laterally extending ear 281 of an arm 282, pivoted at 283 on frame bracket 19. As shown in Figure 3, in the leftmost position of the carriage, release key 272 is aligned with the extension 281, and correspondingly if the carriage is displaced one or more ordinal spaces from its leftmost position, the corresponding key 271 will engage the nose 281 and depress the arm 282. Adjacent its end, arm 282 (Figures 3 and 14) carries roller 284 which is disposed above the upper end of actuating slide 249. Thus, when the carriage shifts into a predetermined position, the actuating slide 249 is operated to move latch 239 from the position shown in Figure 14 to that shown in Figure 15, to release bellcrank 236 and arm 201 and thereby permit disengagement of the shift mechanism for shifting the carriage to the right. This operation will occur toward the end of the last shift cycle.

The downward movement of actuating slide 249 as the carriage enters its selected position also serves to release spring actuated means for meshing the plus-minus gears, and for releasing the dividend key. The downward movement of slide 249 (Figure 14) acts through interponent arm 248 and arms 253 and 254 to rock latching arm 257 in a counter-clockwise direction and thereby move its latching notch 291 out of the path of offset ear 292 of a bellcrank 293, pivoted on pin 294 on side plate 13. Bellcrank 293 is urged in a counter-clockwise direction by a relatively strong spring 296 (Figure 6).

As shown in Fig. 15, the ear 292 of lever 293 moves in front of the ear 301 at the lower end of the lever 190 to retain the slide 193 in its forward position to prevent actuation of the revolutions counter during the following cycle in which the dividend is entered in the accumulator.

The upper end of lever 293 has a cam face 297 (Figs. 14 and 15) which engages a roller 298 on lever 299 whose hub forms one element 321 (Fig. 5) of a clutch, the other element 322 of which is secured to the shaft 87. Movement of lever 299 is transmitted through this clutch to shaft 87, thereby swinging arms 85 and gate 86 to engage addition levels 83 (Fig. 2) with bevels 34 on shafts 32 of accumulator dials 33. Accordingly, in the cycle following arrival of the carriage in its tabulated position the dividend value set in the keyboard is entered in the accumulator.

Movement of lever 299 also serves to actuate latch slide 152 (Figure 6) and thereby release the dividend key.

The movement of bellcrank 293 which initiates the dividend entering operation also enables means for restoring such bellcrank to inoperative position. As shown in Fig. 11, the lower end of bellcrank 293 is connected by link 306 with an arm 307 pivoted on plate 300 and having its upper end normally disposed out of the path of a roller 308, carried by a disc 309 on the end of transverse shaft 72. However, counter-clockwise movement of bellcrank 293 serves through link 306 to move arm 307 into the path of roller 308, so that near the end of the dividend entering cycle of operation after entry of the dividend into the accumulator, roller 308 rocks arm 307, and through link 306 oscillates bellcrank 293 in a clockwise direction so that latch 257 can again move to active position as shown in Fig. 14. The return of bellcrank 293 also moves tooth 292 thereof out of engagement with tooth 301 so that lever 190 and link 193 can return to inactive position, as shown in Fig. 10. Arm 307 (Fig. 11) carries pin 311 normally positioned centrally of slot 312 in link 313 which is pivoted on pin 314 carried by link 128 (Fig. 6) of the drive controlling linkage. Movement of arm 307 clockwise in Fig. 11 positions pin 311 in the right hand end of slot 312 to thereby maintain the parts in drive establishing relation irrespective of release of key 141 in an early part of the cycle.

Tabulation without dividend entering

If desired, a control may be set whereby the carriage may be tabulated to a selected position without entering of the dividend, for example, if the amount set in the keyboard is to be used as a constant divisor and the dividend is set in the accumulator by means of twirlers 33a. As seen in Fig. 7, lever 299 is not directly secured to shaft 87, but is provided with a hub 321 having a clutch connection with a second clutch element 322 secured on shaft 87. Clutch elements 321 and 322 are normally urged apart by spring 323, but are held in engaged position by the lever 324, pivoted at 326 to bracket 295. The lower end of lever 324 is held in the position shown by roller 327 on double arm lever 328 (Figures 7 and 11) pivoted on side plate 13. Lever 328 may be suitably controlled as described in said application, Serial No. 315,986, filed January 27, 1940, to permit disengagement of clutch elements 321 and 322 and thereby eliminate the dividend entering function.

*Multiplier mechanism*

The multiplier mechanism is of the general type disclosed in the copending application of Carl M. Friden and James H. Gemmell, Serial No. 107,806, filed October 27, 1936, for "Calculating machine," now Patent No. 2,327,704, which issued August 24, 1943. The mechanism includes a series of multiplier keys 401 corresponding to multiplier digit values of from "one" to "nine" and each of which effects on depression thereof a number of registrations of the multiplicand corresponding to the value of the depressed key. At the conclusion of any such registration, the carriage is shifted one step to the right, so that the key corresponding to the next higher order multiplier digit can be depressed, until the entire product is registered.

Depression of a multiplier key 401 serves to set the multiplier selection mechanism, to release the multiplier rack to receive such selection, to enable the multiplier rack actuator, and to set various interlocks, all as described hereinafter.

As seen in Figures 5 and 7, multiplier frame plate 402 is secured on side frame plate 13 in spaced relation therefrom by suitable spacers. Multiplier keys 401 are similar and similarly mounted, the entire key section being assembled as a unit on the multiplier plate. Each key 401 (Figure 16) is mounted for endwise movement in a multiplier key frame assembly 403 and is yieldably held in its upper inactive position by sinuous coil spring 404 which extends over suitable frame studs and under suitable pins on the keys 401. Each key 401 after depression thereof is operatively engaged by lock slide 406 as will presently be described. Normally the slide is spring-urged toward the rear of the machine as shown in Fig. 16. Key 407 is a dummy key and performs no function.

As stated above, depression of a key 401 serves to set the multiplier selection mechanism, which is preferably in the form of a series of stops for cooperation with the multiplier rack which is released for engagement with a set stop by the depression of a multiplier key. Each key 401 (Figure 16) carries pin 408 at its lower end for cooperation with the associated selecting arm 409, which has its lower end pivoted on strap 410 secured on multiplier plate 402. Each arm is pivotally connected intermediate its ends to one of selecting stop links 411 which extend rearwardly of the machine between multiplier plate 402 and retaining strap 412 suitably secured in spaced relation thereon. Springs 413 are tensioned between strap 412 and links 411 and serve to urge links 411 to the inoperatve positions thereof illustrated in Figure 16, with arms 409 engaging pins 408 on the multiplier keys.

Adjacent their rear ends each link 411 carries a flanged stud 414 which engages in a corresponding guide slot formed in the arcuate forward edge of guide plate 416, which is suitably secured in spaced relation from multiplier plate 402. As seen in Figure 17, each link 411 has beveled stop end 417, and ends 417 are positioned in an arc for cooperation, when projected to active position, with a multiplier rack as described hereinafter.

From the above description, it appears that depression of a multiplier key 401 serves to rock the associated selecting arm 409 and move a selecting link 411 rearwardly of the machine to active position. In such position, the stop end 417 of an active link 411 is positioned differentially from the multiplier rack in accordance with the value of the depressed multiplier key. The multiplier rack 421 is normally latched in inactive position and is released by depression of a multiplier key to move into engagement with the set stop 417. Subsequently, the multiplier rack is returned step by step to and past its inactive position for a purpose later described.

Multiplier rack 421 (Figure 17) is pivotally mounted on stub shaft 422 secured between multiplier plate 402 and guide plate 416. Rack 421 is formed as an arcuate sector and has ten teeth 423 formed on the periphery thereof, adjacent unbroken arcuate portion 424 which terminates in beveled stop engaging face 426. Rack 421 is urged in a clockwise direction by spring 427, and is held in its inoperative position shown in Figure 17 by latch pawl 428 which has the flat end thereof engaged with face 426 of the rack.

Latch pawl 428 is pivoted at 429 on guide plate 416 and is oscillated upon depression of a multiplier key 401 to release rack 421 and permit movement thereof by spring 427 into engagement with the stop 417 which is set by the depressed key 401. For this purpose, latch pawl 428 (Figure 16) has a rounded end thereof embraced by the forked end of release lever 431 pivoted on guide plate 416. Offset end 432 of lever 431 is urged upwardly by spring 433 and underlies a shoulder (Figures 16 and 17) formed on link 434 which is pivotally connected at 436 to multiplier rack release slide 437. Slide 437 is mounted for limited vertical sliding movement on multiplier plate 402 and is urged to its upper or inactive position by spring 438 connected between the upper end thereof and plate 402. Movement of the release slide downwardly from its inactive position serves through link 434, lever 431 and pawl 428 to release the multiplier rack, and to effect such movement, slide 437 is provided with a plurality of similar vertically spaced cam surfaces for cooperation with pins 439 on links 411.

Figure 19:
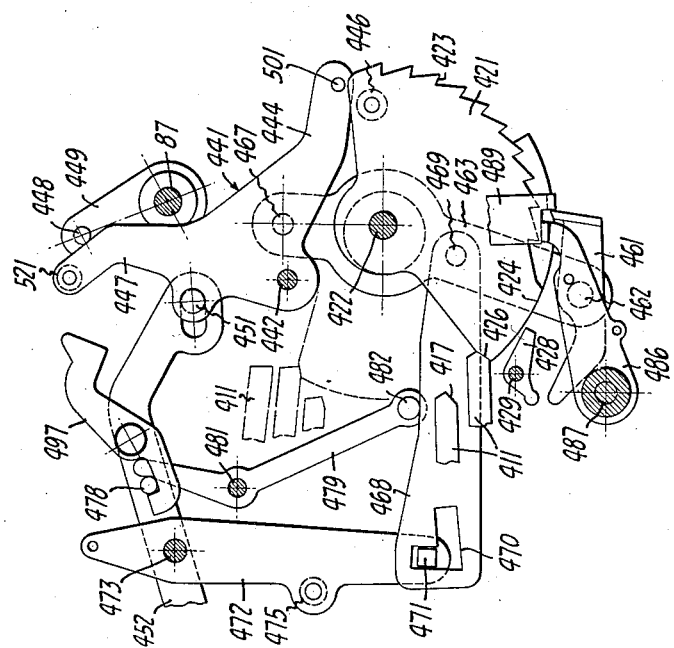

From the above description it is seen that depression of a key 401, through the associated link 411 and pins 439 thereon serves to move slide 437 and link 434 downwardly, thereby rocking lever 431 and pawl 428 to release multiplier rack 421. This condition is illustrated in Figure 19 where rack 421 is shown in full lines as positioned with the "one" key depressed, and in dotted lines as positioned with the "eight" key depressed.

The movement of multiplier rack 421 from its inactive position shown in Figure 17 serves to release a spring-pressed restrained element or bellcrank 441 (Figures 16 and 17) pivoted at 442 and urged in a clockwise direction by comparatively strong spring 443. Bellcrank 441 is restrained by the engagement of horizontal arm 444 thereof with roller stud 446 on rack 421. Upon movement of rack 421 to active position, bellcrank 441 moves under the influence of spring 443 from the position shown in Figure 17 to that shown in Figure 19.

To set the plus-minus gears by movement of bellcrank 441, the vertical arm 447 thereof has its upper bent end operatively related with, but slightly spaced from stud 448 of arm 449 which is secured on shaft 87. As heretofore described, rocking of shaft 87 controls the position of the plus-minus gears. As seen in Figure 17, arm 447 is spaced from stud 448 a sufficient distance to permit movement of shaft 87 and arm 449 in setting the machine for subtraction. It is also seen that clockwise movement of bellcrank 441 serves through arm 447 thereof and arm 449 to rock shaft 87 so that plus gears 83 (Figure 2) are meshed with numeral wheel gears 34. To engage the clutch, vertical arm 447 (Figure 16) of bellcrank 441 carries pin 451 (Figures 16 and 18) which extends through multiplier plate 402 and engages in the slotted rear end of link 452 (Figure 18) having its forward end pivotally connected to arm 453 pivotally mounted on plate 402. Arm 453 carries pin 454 which abuts link 313 (Figure 11) carried by pin 314 on clutch control link 128 (Figure 6). As previously described, the clutch is engaged and the motor energized by rearward movement of link 128. A spring-urged bellcrank 457 (Fig. 16) pivotally mounted on plate 416 has a roller 456 normally engaging the upper edge of rack sector 421. A spring 457' is provided to urge the bell-crank 457 clockwise in Figure 16. The forward end of bellcrank 457 underlies an end of an associated bellcrank 458 pivoted on strap 412. Bellcrank 458 has an ear 459 operatively related to slide 406 to cause movement of such slide into locking engagement with the depressed key for the duration of the multiplying operation. Upon depression of a multiplier key the sector 421 releases bellcrank 457 which then actuates bellcrank 458 to operate lock slide 406, as shown in Fig. 21.

Upon engagement of the clutch, a step by step drive means for the multiplier rack becomes active to return the rack to normal or inactive position and one step beyond during the shift cycle of the actuating means, the next to last step being utilized to determine the shift and restore certain parts to normal, and the last step or shift cycle step being used to complete the normalizing operation. Also the latch pawl for the multiplier rack is normalized during the first step of movement.

The multiplier rack actuating mechanism includes actuating pawl 461 (Figure 17) pivoted at 462 on actuating arm 463 and having an offset tooth urged toward rack teeth 423 by spring 464 tensioned between pawl 461 and arm 463. Pawl 461 is maintained inactive or retracted by engagement of the inclined tail thereof with one of spacers 466. Arm 463 is pivoted at 467 on plate 402 and is apertured intermediate its ends to engage freely over shaft 422. During a multiplying operation, arm 463 is oscillated at each cycle of operation of the main actuating means by a linkage including link 468 having one end pivotally connected thereto at 469 and having its other end selectively connected by L-slot 470 to pin 471 on cam follower 472. Follower 472 is pivoted at 473 on plate 402 and is urged in a clockwise direction by spring 474 secured thereto and to plate 402, to engage a roller 475 thereon with cam 476 secured on transverse clutch driven shaft 72. Thus, upon each cycle of operation of the actuating means, cam 476 (Figure 17) oscillates follower 472, such oscillation being idle as long as pin 471 registers with the horizontal portion of slot 470 where it is normally maintained by the urgency of spring 477 on arm 468. Upon movement of bellcrank 441 and link 452 to active position, pin 478 on link 452 rocks lever 479 which is pivoted at 481 on plate 402. The lower end of lever 479 carries a roller 482 overlying arm 468 to depress the arm at the beginning of a multiplying operation. In this way, pin 471 is engaged with the vertical portion of slot 470 to establish a driving relation between follower 472 and arm 468. Thus actuating arm 463 oscillates pawl 461 and effects a one step advance of rack 421 in a counterclockwise direction during a multiplying operation.

A holding pawl is associated with rack 421 to maintain an advanced position thereof, such pawl being maintained disabled until the first return step of movement of the rack. Holding pawl 486 (Figure 16) is pivoted at 487 on plate 416 and has an offset tooth extending therethrough into operative relation with teeth 423 of rack 421 under the influence of spring 488 connected between the holding pawl and plate 416. The holding pawl is normally disabled by engagement with surface 424 of rack 421. After setting of rack 421, the holding pawl is maintained disabled by arm 489 pivoted on plate 416 and having a shoulder at its lower end overlying the tooth of pawl 486. Upon the first oscillation of actuating pawl 461, latch 489 is moved from above holding pawl 486 by pawl 461 and holding pawl 486 moves to active position.

The first step of movement during multiplication also serves to re-enable latching pawl 428 for rack 421. For this purpose, link 434 (Figures 16 and 17) is pivotally connected to link 491, which is also pivotally connected to spring-urged lever 492 pivoted on plate 402. At its upper end, lever 492 has a nose which in the full cycle position of the actuating means engages a complementary notch in cam disc 493 on cam 476. It will be noted that upon rotation of disc 493 from full cycle position, lever 492 is oscillated and through link 491, rocks link 434 to move the shoulder thereof from over offset end 432 of lever 431. Lever 431 is then free, with latch pawl 428, to return to normal position under the influence of spring 433, so that pawl 428 will engage face 426 of rack 421 when the rack is restored to its neutral inactive position at the end of the operation.

During the next to last cycle of a multiplying operation, that is, the last value entering cycle, rack 421 engages roller 456, rocking bellcranks 457, 458 to withdraw ear 459 rearwardly, permitting slide 406 to move rearwardly under the influence of its spring, thereby releasing the depressed multiplier key. Rack 421 also engages bell crank 441 to normalize certain parts of the mechanism and to condition the parts for a carriage shift, by cocking the shift control mechanism, such control mechanism being effective however only at the end of such next to last cycle. During the next to last step of movement of rack 421, roller stud 446 thereon engages and moves bellcrank 441 from the position shown in Figure 19 to that shown in Figure 20, where arm 449 and shaft 87 have moved back to neutral position so that plus gears 83 and numeral wheel gears 34 are disengaged. The disengagement of gears 83 and 34 is not effected, however, until after the value entering operation is completed. Figure 20 shows the parts during the next to the last cycle of any multiplying operation when pawl 461 is at its extreme active position. It is to be noted that at this time, bellcrank 441 has moved to a position which would permit movement of link 452 and arm 453 (Figure 18) to clutch disengaging position, such movement being prevented however by the engagement of pin 473 (Figure 20) with spring-urged latch lever 497 which maintains the engagement of the clutch during the shift cycle.

To enable the shift, arm 444 of bellcrank 441 carries pin 501 (Figures 17 and 18) which engages in the notched end of arm 502 pivoted on plate 402. Live pawl 503 pivoted at 504 on arm 502 and spring urged in a counterclockwise direction by spring 506, has offset ear 507 which in the inactive position of the part overlies the nose of lever 508 and lies above pin 509 on arm 502. Arm 508 is pinned on shaft 187 which is pivotally mounted in plate 402 and side plate 13 (Figure 7).

Upon depression of a multiplier key, the parts are positioned as shown in Figure 18, the release of bellcrank 441 and its subsequent clockwise movement (as viewed in Figure 17) serving through pin 501 to move arm 502 downwardly from the position shown in Figure 18 so that pawl 503 snaps past the nose of arm 508 to position ear 507 below the nose. During the next to last step of movement, pin 501 moves or restores arm 502 upwardly by virtue of the step of movement of bellcrank 441 under control of rack 421 to condition the machine for a one step shift of the carriage. Arm 502 through pin 509 and pawl 503 rocks arm 508 and holds the arm in rocked position until release of the parts during the last cycle as later described.

Such movement of arm 508 and shaft 187 conditions and enables the shift mechanism. For this purpose shaft 187 (Figures 4 and 7) has shift conditioning arm 511 secured thereon. Arm 511 carries lever 512 pivoted thereon at 513. The lower end of lever 512 is connected by spring 514 with arm 511. Lever 512 has upper hooked end 516 positioned forwardly of one of shift forks 110 and in operative controlling relation therewith.

From the above described arrangement, it is seen that rocking of shaft 187 and arm 511 during the next to last cycle of a multiplying operation, tensions spring 514 and thereby places a bias on shift initiating arm 512 whose end 516 is urged against the associated shift fork 110. When the parts including collar 109 reach full cycle position at the end of such next to last cycle of the multiplying operation, spring 514 operating through shift initiating arm 512 becomes effective to engage the shift drive and determine a carriage shift during the last cycle of a multiplying operation.

As noted above, the shift or last cycle of a multiplying operation is utilized to complete normalizing of the machine by restoring all active parts to neutral or inactive position. For this purpose, rack 421 is operated for an overstroke during the shift cycle to move bellcrank 441 and effect such normalizing operation, rack 421 and bellcrank 441 being moved away from and immediately returned to the position shown in Figure 16. Movement of bellcrank 441 during such overstroke serves through pin 501 (Figure 18) to lift arm 502 a sufficient amount to move pawl 503 above the nose of arm 508 to permit return of arms 508 and 511 to inactive position to release the bias of spring 514 on the shift control mechanism. At the same time, pawl 503 is relatched to the position shown in Figure 18.

To effect release of the clutch, upper arm (Figure 17) of bellcrank 441 carries roller 521, which upon the counterclockwise movement of bellcrank 441 during the shift cycle of the multiplying operation engages the adjacent end of lever 497 effecting counter clockwise movement thereof to release pin 478 on link 452, to permit return of the drive controlling means to inactive position.

*Tabulation with multiple entry*

Means is provided for coordinating the operation of the tabulating mechanism with the multiplier mechanism so that, when desired, an automatic sequential operation thereof can be obtained to enable tabulation of the carriage to a selected position and multiple entry of an item in such selected position. In order to accomplish this result, a manually settable control is provided which, when set to active position while a multiplier key is depressed, maintains such multiplier key depressed. At the same time the control conditions the machine for coordinated operation whereby the multiplier mechanism is tripped concurrently with the single entry cycle mechanism of the tabulation device.

Referring to Figures 16 and 21, a control lever 531 is provided which is settable between an inactive position shown in Figure 16 and an active position shown in Figure 21. Lever 531 is pivoted by stud 532 on multiplier plate 402 and carries a pin 533 adapted for engagement with either of two V-notches in a spring-urged latch pawl 534 suitably pivoted on the machine. The lower end of control lever 531 has a pin and slot connection at 536 with a lever 537 pivoted at 538 on strap 412. Lever 537 has a pivotal slidable connection at its lower end with a lever 539 pivoted at 541 on strap 412. The lower end of lever 539 is pivotally connected with link 542 which extends rearwardly of the machine and is provided with a longitudinal slot for engagement with a pin 543 on a pivoted bellcrank 544. The lower arm of bellcrank 544 underlies a pin 546 carried by lever 547 pivoted at 487 and urged in a clockwise direction by spring 549. The opposite end of lever 547 carries a pin 551 overlying but normally spaced from the tail 432 of pawl releasing lever 431. Upon setting of control lever 531, lever 547 will be rocked to move pawl pin 551 adjacent to the lever 431 where it will be maintained while the lever 531 is in active position. Lever 547 is in effect substituted for the link 434 which is not effective during multiple entry operation in releasing the multiplier rack. Bellcrank 544 is operated during the multiple entry operation as later described to release or trip the multiplier mechanism.

In order to disable the counter during the multiple entry operation, a rearward end of link 542 (Figure 16) abuts a pin 556 carried by an arm of a pivoted bail 557. Bail 557 (Figure 10) has a short arm connected by spring 560 with a second arm 558. Arm 558 has a pin 559 underlying a portion of lever 190 so that slide 193 is moved to position its projection 194 in blocking relation with the arm 58 of the counter actuator. The spring connection 560 yieldably holds lever 190 and slide 193 in active position so that the counter can be enabled during another machine operation, division for example, with control lever 531 in active position.

The movement of bellcrank 544 from the position shown in Figure 16 to that shown in Figure 21 serves to condition means for release of bellcrank 441. As shown in Figure 16, the upper arm of bellcrank 544 normally lies out of the path of a pin 561 carried by a lever 562 pivoted at 563 and integrally connected with a second lever 564 having a common pivot therewith and provided with a roller 566 underlying an arm of bell crank 293. Thus when bell crank 293 is released and moved to active position as previously described under the urgency of its spring, no actuation of bell crank 544 will occur with the parts positioned as shown in Figure 16. However, with the lever 531 set to active position as shown in Figure 21, the pin 561 engages the bevelled nose of bell crank 544 and rocks it to the position shown in Figure 22. In this position, the multiplier rack 421 is released and the mutiple entry occurs in accordance with the value of the depressed multiplier key under control of the multiplier mechanism, the relatching of bell crank 293 in inactive position being ineffective to terminate the operation.

Once a multiplier key is depressed, it is locked in depressed position by setting of the lever 531. As shown in Figure 21, when the lever 531 is moved to active position, a latching extension 567 moves behind ear 459 of the locking bell crank 458 so that the lock slide 406 is maintained in active position as long as the lever 531 is set to active position. Subsequent operations are carried out by merely depressing the tabulating key 141 whereupon the accumulator and counter will be cleared and the carriage will be shifted to the position determined by the depressed tabulator key 271 where the multiplier mechanism will be brought into play to make the multiplier entry in the accumulator without performing an entry in the counter.

This type of operation is especially advantageous in problems wherein repeated multiple entry of a similar value of different items is required in performing accounting operations.

When the machine is conditioned for tabulation with multiple item entry, the keyboard release means is disabled. Pin 454 (Figures 11, 11A and 13) on arm 453 is connected by link 571 with lever 572 (Figure 11A) pivoted at 573. Lever 572 overlies pin 574 on arm 576 pivoted at 577 on side plate 13. Lever 576 overlies pin 578 on lever 65 whose hooked end normally engages the end of key release bail 579. Thus, when arm 453 is moved to active position link 571, lever 572 and arm 576 are operated to rock lever 65 against the urgency of its spring and disengage its hooked end from the key release bail. Thus, even though the key release mechanism is conditioned for operation, it is rendered ineffective during tabulation with multiple entry.

To briefly summarize the operation of the multiple entry mechanism, the operator first enters the multiplicand in the keyboard. The correct multiplier key is then depressed and while the multiplication is being performed, the lever 531 is set to active position to condition the machine for subsequent multiple entry operations involving the same factor. The entry in the revolutions counter is meaningless and is automatically cleared out in the next operation. Subsequent multiplying operations require only the setting of the desired tabulator stop key 271 and depression of the dividend tabulating key 141 whereupon the accumulator is reset and the carriage is automatically tabulated to the selected position. At the end of the tabulating operation a multiple entry of the item is effected in accordance with the value of the set multiplier key.

The machine of my invention facilitates handling a series of calculations where the multiplier factor is a constant, particularly where each multiplication is followed by a division. After the constant multiplier factor is set in the machine by depressing a key 401 and moving the lever 531 to its forward position a subsequent calculation may consist of (1) setting the multiplicand in the keyboard; (2) depressing the tabulating key 141 (Fig. 1); (3) after the product appears in the accumulator, dividing it by a divisor; (4) reading the quotient. These operations are then repeated for the next calculation.

I claim:

1. In a calculating machine having a shiftable register carriage, tabulating mechanism for said carriage including means for selecting the ordinal position to which the carriage is to be shifted and a manually operable tabulating key for initiating operation of said tabulating mechanism, and multiplier mechanism for causing multiple entry of items in said register including a series of manually operable multiplier keys and means for locking a depressed key in depressed position during a multiplying operation, the combination with said mechanisms of selectively operable control means including a manually settable member and controlling connections from said member to said mechanisms to render said multiplier mechanism operable in response to operation of said tabulating mechanism for sequential operation upon depression of said tabulating key, said manually settable member being movable to active position with a multiplier key depressed to maintain said locking means active.

2. In a calculating machine having a shiftable register carriage, tabulating mechanism for said carriage including means for selecting the ordinal position to which the carriage is to be shifted, and a manually operable tabulating key for initiating operation of said tabulating mechanism, and multiplier mechanism for causing multiple entry of items in said register including a series of manually operable multiplier keys, the combination with said mechanisms of selectively operable control means including a manually settable member, normally ineffective tripping means for initiating operation of said multiplier mechanism at the end of the operation of said tabulating mechanism, means operated by said member for rendering said tripping means effective, and means operated by said carriage upon movement of said carriage into the selected ordinal position for operating said tripping means.

3. In a calculating machine having a shiftable accumulator and actuating means therefor, tabulating means including means for shifting said accumulator to a selected ordinal position and including means for arresting said accumulator in said position, multiplier mechanism including a series of multiplier keys and means for causing selective multiple entry of items by said actuating means in said accumulator in response to depression of a multiplier key, said last-named means including an operation-initiating element normally positioned to prevent operation of the machine under control of said multiplier mechanism and tripped by depression of a multiplier key to initiate such operation, a manually operable tabulator control key for initiating operation of said tabulating means, and mechanism controlled by a settable means for bringing said multiplier mechanism into operation under control of said arresting means including normally-inoperative means for tripping said element rendered operative by said settable means and actuated by said arresting means.

ANTHONY B. MACHADO.